(No Model.)
H. M. DU BOIS.
RIM FOR VEHICLE WHEELS.
No. 424,766. Patented Apr. 1, 1890.
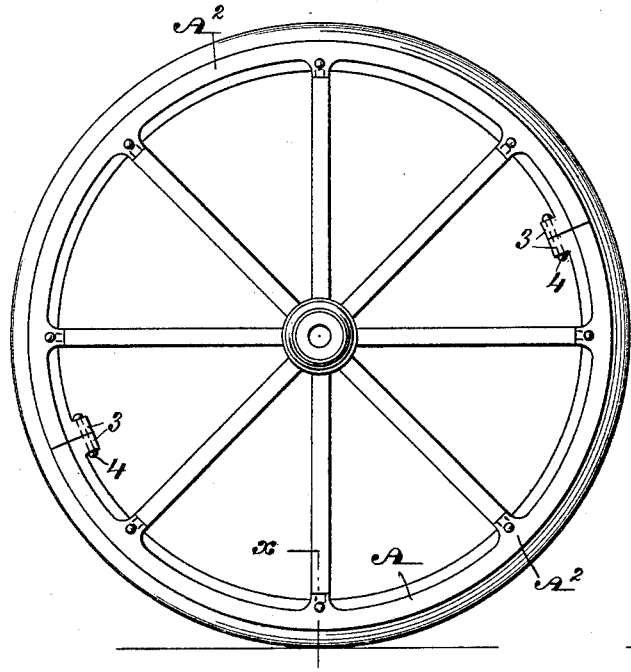
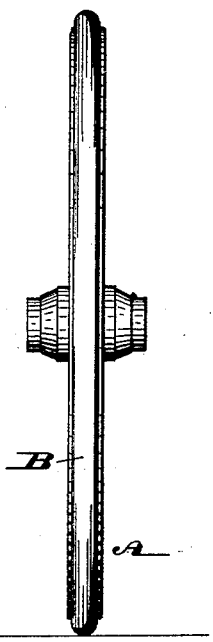
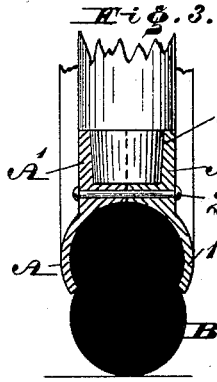
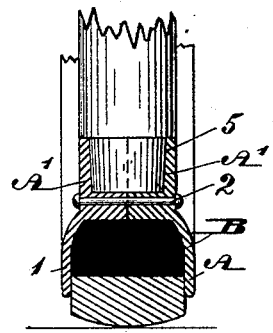
Witnesses
Theo Rollé.
A. P. Jennings.
Inventor
Howard M. Du Bois.
By his Attorneys
Diedersheim & Kintner

UNITED STATES PATENT OFFICE.

HOWARD M. DU BOIS, OF PHILADELPHIA, PENNSYLVANIA.

RIM FOR VEHICLE-WHEELS.

SPECIFICATION forming part of Letters Patent No. 424,766, dated April 1, 1890.

Application filed February 18, 1889. Serial No. 300,317. (No model.)

*To all whom it may concern:*

Be it known that I, HOWARD M. DU BOIS, a citizen of the United States, residing in the city and county of Philadelphia, State of Pennsylvania, have invented a new and useful Improvement in Tires for Vehicle-Wheels, which improvement is fully set forth in the following specification and accompanying drawings.

My invention relates to improvements in tires formed of metal and rubber or elastic treads; and it consists in forming said tires in longitudinal divisions, between which the treads are clamped or held.

It also consists of other novel features, as will be hereinafter fully set forth.

Figures 1 and 2 represent views at a right angle to each other of tires for vehicle-wheels embodying my invention. Fig. 3 represents a section of a portion thereof on line $xx$, Fig. 1, on an enlarged scale. Fig. 4 represents a section of a modification.

Similar letters and numerals of reference indicate corresponding parts in the several figures.

Referring to the drawings, A designates the tire of a vehicle-wheel and B the tread thereof, said tire being formed of wrought-iron, steel, or other suitable metal or material, with side flanges $l$, producing a circumferential channel, into which the inner portion of the tread is received, said tread being made of soft rubber or other elastic material. The tire is divided longitudinally, forming the sections A', which are held together by the screws, bolts, or rivets 2, and retaining the tread B between them. The outer faces of said sections A' are flush with the rim of the wheel, the sections forming a circumferential groove, in which the said rim rests. The sections are also divided circumferentially, forming segments $A^2$, the ends of which are formed with ears 3, through which are passed screws or bolts 4, by means of which the segments are held together and connected as one. The longitudinal sections are each formed with a main portion having plane vertical contiguous faces, whereby when the sections are joined the said faces are in contact at all points and in the one plane, as shown in Figs. 3 and 4.

It will be seen that as the inner diameter of the tread B is less than that of the outer diameter of the tire said tread may be readily inclosed within the tire by separating the sections A' thereof, after which the sections are properly fitted around the inner portion of the tread and the rivets, screws, or bolts applied, whereby the sections A' are brought together and the tread clamped between them. The sections are provided at intervals with sockets 5 to receive the tenons of the spokes.

It is evident that the screws or bolts 4 draw the segments closely together and firmly upon the shoulders of the spokes, causing the wheel to have a proper "dish," it being seen that I produce a wheel in which an elastic tread is combined with a metallic tire, the same being serviceable and durable, and one that is prevented from being rim-bound.

In Fig. 4 the tread consists of a metallic tire, between which and the channeled tire A an elastic cushion B is interposed, said tire and cushion being confined by the flanges of the tire A.

Having thus described my invention, what I claim as new, and desire to secure by Letters Patent, is—

1. A channeled tire formed of segmental sections $A^2$, divided longitudinally, forming sections A', and provided with ears at the ends of the former sections, and screws or fastening devices, substantially as described.

2. A sectional tire consisting of a longitudinal and segmental sections, each of said sections having ears at their ends and provided with connecting-bolts, the continuous sides of said sections being vertical, said parts being combined substantially as described.

3. A tire for a bicycle, consisting of longitudinal and segmental sections provided with ears at their ends and connecting-bolts and having sockets for the spokes, and an outer channel with a tread therein, said parts being combined substantially as described.

HOWARD M. DU BOIS.

Witnesses:
JOHN A. WIEDERSHEIM,
A. P. JENNINGS.